United States Patent
Madnani et al.

(10) Patent No.: US 8,099,549 B1
(45) Date of Patent: Jan. 17, 2012

(54) SYSTEM AND METHOD FOR ERASURE ENCODING

(75) Inventors: Kiran Madnani, Framingham, MA (US); Randall H. Shain, Wrentham, MA (US); Roy E. Clark, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 1053 days.

(21) Appl. No.: 11/967,898

(22) Filed: Dec. 31, 2007

(51) Int. Cl.
*G06F 12/00* (2006.01)

(52) U.S. Cl. ... 711/114; 370/312; 370/390; 707/999.01; 711/162

(58) Field of Classification Search ............ 370/312, 370/390; 707/999.01; 711/114, 162
See application file for complete search history.

(56) References Cited

U.S. PATENT DOCUMENTS

| | | | |
|---|---|---|---|
| 6,665,780 B1 * | 12/2003 | Bradley | 711/162 |
| 6,834,326 B1 * | 12/2004 | Wang et al. | 711/114 |
| 6,950,901 B2 * | 9/2005 | Chiu et al. | 711/114 |
| 7,529,781 B2 * | 5/2009 | Frey et al. | 1/1 |
| 7,590,114 B1 * | 9/2009 | Bishara | 370/390 |
| 7,673,112 B2 * | 3/2010 | Takeuchi et al. | 711/170 |
| 7,843,866 B1 * | 11/2010 | Madnani et al. | 370/312 |
| 2005/0254444 A1 * | 11/2005 | Meier et al. | 370/312 |
| 2005/0256972 A1 * | 11/2005 | Cochran et al. | 709/245 |
| 2006/0291467 A1 * | 12/2006 | Henry et al. | 370/390 |
| 2008/0040646 A1 * | 2/2008 | Forhan et al. | 714/770 |
| 2009/0094252 A1 * | 4/2009 | Wong et al. | 707/10 |
| 2009/0177840 A1 * | 7/2009 | Dale et al. | 711/118 |

* cited by examiner

*Primary Examiner* — Kevin Ellis
*Assistant Examiner* — Mehdi Namazi
(74) *Attorney, Agent, or Firm* — Holland & Knight LLP; Brian J. Colandreo, Esq.; Mark H. Whittenberger, Esq.

(57) ABSTRACT

A method and computer program product for defining a multicast group within a local area network. The multicast group includes a storage initiator device, a plurality of storage targets, and one or more coded targets. A write request for storing a data segment within the multicast group is received on the storage initiator device. The data segment is multicast to the plurality of storage targets and the one or more coded targets included within the multicast group. A unique data chunk of the data segment is stored on each of the plurality of storage targets. A unique coded chunk of the data segment is generated and stored on each of the one or more coded targets.

20 Claims, 3 Drawing Sheets

SYSTEM AND METHOD FOR ERASURE ENCODING

TECHNICAL FIELD

This disclosure relates to storage networks and, more particularly, to multicast storage networks.

BACKGROUND

Storing and safeguarding electronic data is of paramount importance in modern business. Accordingly, various systems may be employed to protect such electronic data.

For example, disk arrays may be employed that contain multiple storage devices. Disk arrays may provide some level of redundancy by use of mirrored or redundant components (e.g., disk drives, disk controllers, power supplies and/or fans), each of which may be hot-swappable to avoid downtime.

Disk arrays may fall into a plurality of categories, such as Network Attached Storage (NAS) and Storage Area Networks (SAN). An NAS may be a stand-alone, network-accessible, hard disk storage system that may provide file-level access to electronic data. A SAN array may be a dedicated storage system that may connect numerous storage resources to one or many servers. A SAN may provide block-level access to electronic data through one or more SCSI-based protocols (e.g., Fiber Channel and iSCSI).

SUMMARY OF DISCLOSURE

In a first implementation, a multicast data striping method includes defining a multicast group within a local area network. The multicast group includes a storage initiator device, a plurality of storage targets, and one or more coded targets. A write request for storing a data segment within the multicast group is received on the storage initiator device. The data segment is multicast to the plurality of storage targets and the one or more coded targets included within the multicast group. A unique data chunk of the data segment is stored on each of the plurality of storage targets. A unique coded chunk of the data segment is generated and stored on each of the one or more coded targets.

One or more of the following features may be included. Defining the multicast group may include one or more of: defining a group of IP addresses to be addressable as a whole by a single multicast IP address; and defining a group of MAC addresses to be addressable as a whole by a single multicast IP address. The unique coded chunk may be generated using one or more of the unique data chunks. Generating the unique coded chunk using one or more of the unique data chunks may include generating, on the one or more coded targets, the unique coded chunk using one or more of the unique data chunks. At least one of the plurality of storage targets may be chosen from the group consisting of: a hard drive; a RAID array of hard drives; a computer device including one or more hard drives; and a storage area network.

In another implementation, a computer program product resides on a computer readable medium that has a plurality of instructions stored on it. When executed by a processor, the instructions cause the processor to perform operations including defining a multicast group within a local area network. The multicast group includes a storage initiator device, a plurality of storage targets, and one or more coded targets. A write request for storing a data segment within the multicast group is received on the storage initiator device. The data segment is multicast to the plurality of storage targets and the one or more coded targets included within the multicast group. A unique data chunk of the data segment is stored on each of the plurality of storage targets. A unique coded chunk of the data segment is generated and stored on each of the one or more coded targets.

One or more of the following features may be included. Defining the multicast group may include one or more of: defining a group of IP addresses to be addressable as a whole by a single multicast IP address; and defining a group of MAC addresses to be addressable as a whole by a single multicast IP address. The unique coded chunk may be generated using one or more of the unique data chunks. Generating the unique coded chunk using one or more of the unique data chunks may include generating, on the one or more coded targets, the unique coded chunk using one or more of the unique data chunks. At least one of the plurality of storage targets may be chosen from the group consisting of: a hard drive; a RAID array of hard drives; a computer device including one or more hard drives; and a storage area network.

In another implementation, a multicast data striping method includes defining a multicast group within a local area network. The multicast group includes a storage initiator device, a plurality of storage targets, and one or more coded targets. A read request for reading a data segment from the multicast group is received on the storage initiator device. The read request is multicast to the plurality of storage targets and the one or more coded targets included within the multicast group. One or more unique data chunks of the data segment are received on the storage initiator device from the plurality of storage targets. A unique coded chunk of the data segment is received on the storage initiator device from each of the one or more coded targets.

One or more of the following features may be included. Defining the multicast group may include one or more of: defining a group of IP addresses to be addressable as a whole by a single multicast IP address; and defining a group of MAC addresses to be addressable as a whole by a single multicast IP address. At least one of the plurality of storage targets may be chosen from the group consisting of: a hard drive; a RAID array of hard drives; a computer device including one or more hard drives; and a storage area network.

The unique data chunks received from the plurality of storage targets may be combined on the storage initiator device to reconstruct the data segment. If the unique data chunks received from the plurality of storage targets are insufficient to reconstruct the data segment, one or more missing data chunks may be regenerated using one or more of: the unique data chunks received from the plurality of storage targets; and the unique coded chunk received from each of the one or more coded targets.

In another implementation, a computer program product resides on a computer readable medium that has a plurality of instructions stored on it. When executed by a processor, the instructions cause the processor to perform operations including defining a multicast group within a local area network. The multicast group includes a storage initiator device, a plurality of storage targets, and one or more coded targets. A read request for reading a data segment from the multicast group is received on the storage initiator device. The read request is multicast to the plurality of storage targets and the one or more coded targets included within the multicast group. One or more unique data chunks of the data segment are received on the storage initiator device from the plurality of storage targets. A unique coded chunk of the data segment is received on the storage initiator device from each of the one or more coded targets.

One or more of the following features may be included. Defining the multicast group may include one or more of: defining a group of IP addresses to be addressable as a whole by a single multicast IP address; and defining a group of MAC addresses to be addressable as a whole by a single multicast IP address. At least one of the plurality of storage targets may be chosen from the group consisting of: a hard drive; a RAID array of hard drives; a computer device including one or more hard drives; and a storage area network.

The unique data chunks received from the plurality of storage targets may be combined on the storage initiator device to reconstruct the data segment. If the unique data chunks received from the plurality of storage targets are insufficient to reconstruct the data segment, one or more missing data chunks may be regenerated using one or more of: the unique data chunks received from the plurality of storage targets; and the unique coded chunk received from each of the one or more coded targets.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
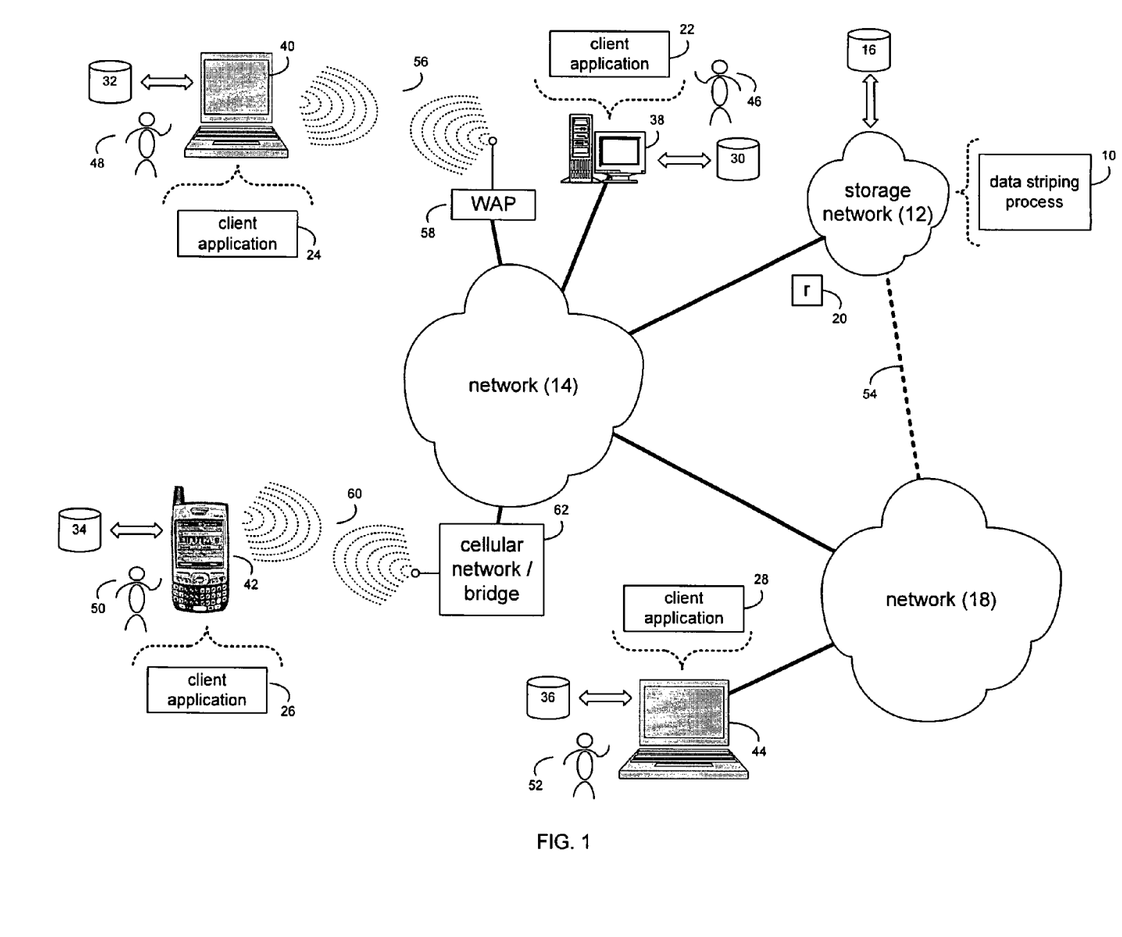
FIG. 1 is a diagrammatic view of a storage array and a data striping process coupled to a distributed computing network.

Referring to FIG. 1, there is shown data striping process 10 that may reside on and may be executed by storage network 12, which may be connected to network 14 (e.g., the Internet or a local area network). Examples of storage network 12 may include, but are not limited to: a Network Attached Storage (NAS) system and a Storage Area Network (SAN). As will be discussed below in greater detail, a SAN may include one or more of a personal computer, a server computer, a series of server computers, a mini computer, a mainframe computer, a RAID array and an NAS. The various components of storage network 12 may execute one or more operating systems, examples of which may include but are not limited to: Microsoft Windows XP Server™; Novell Netware™; Redhat Linux™, Unix, or a custom operating system, for example.

As will be discussed below in greater detail, data striping process 10 may define a multicast group within a local area network. The multicast group may include a storage initiator device, a plurality of storage targets, and one or more coded targets.

A write request for storing a data segment within the multicast group may be received on the storage initiator device. The data segment may be multicast to the plurality of storage targets and the one or more coded targets included within the multicast group. A unique data chunk of the data segment may be stored on each of the plurality of storage targets. A unique coded chunk of the data segment may be stored on each of the one or more coded targets.

A read request for reading a data segment from the multicast group may be received on the storage initiator device. The read request may be multicast to the plurality of storage targets and the one or more coded targets included within the multicast group. One or more unique data chunks of the data segment may be received on the storage initiator device from the plurality of storage targets. A unique coded chunk of the data segment may be received on the storage initiator device from each of the one or more coded targets.

The instruction sets and subroutines of data striping process 10, which may be stored on storage device 16 included within storage network 12, may be executed by one or more processors (not shown) and one or more memory architectures (not shown) included within storage network 12. Storage device 16 may include but is not limited to: a hard disk drive; a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Various data requests (e.g. data request 20) may be sent from client applications 22, 24, 26, 28 to storage network 12. Examples of data request 20 may include but are not limited to data write requests (i.e. a request that a data segment be written to storage network 12) and data read requests (i.e. a request that a data segment be read from storage network 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage network 12 directly through network 14 or through secondary network 18. Further, storage network 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

The Data Striping Process:

For the following discussion, client application 22 is going to be described for illustrative purposes. However, this is not intended to be a limitation of this disclosure, as other client applications (e.g., client applications 24, 26, 28) may be equally utilized.

Figure 2:
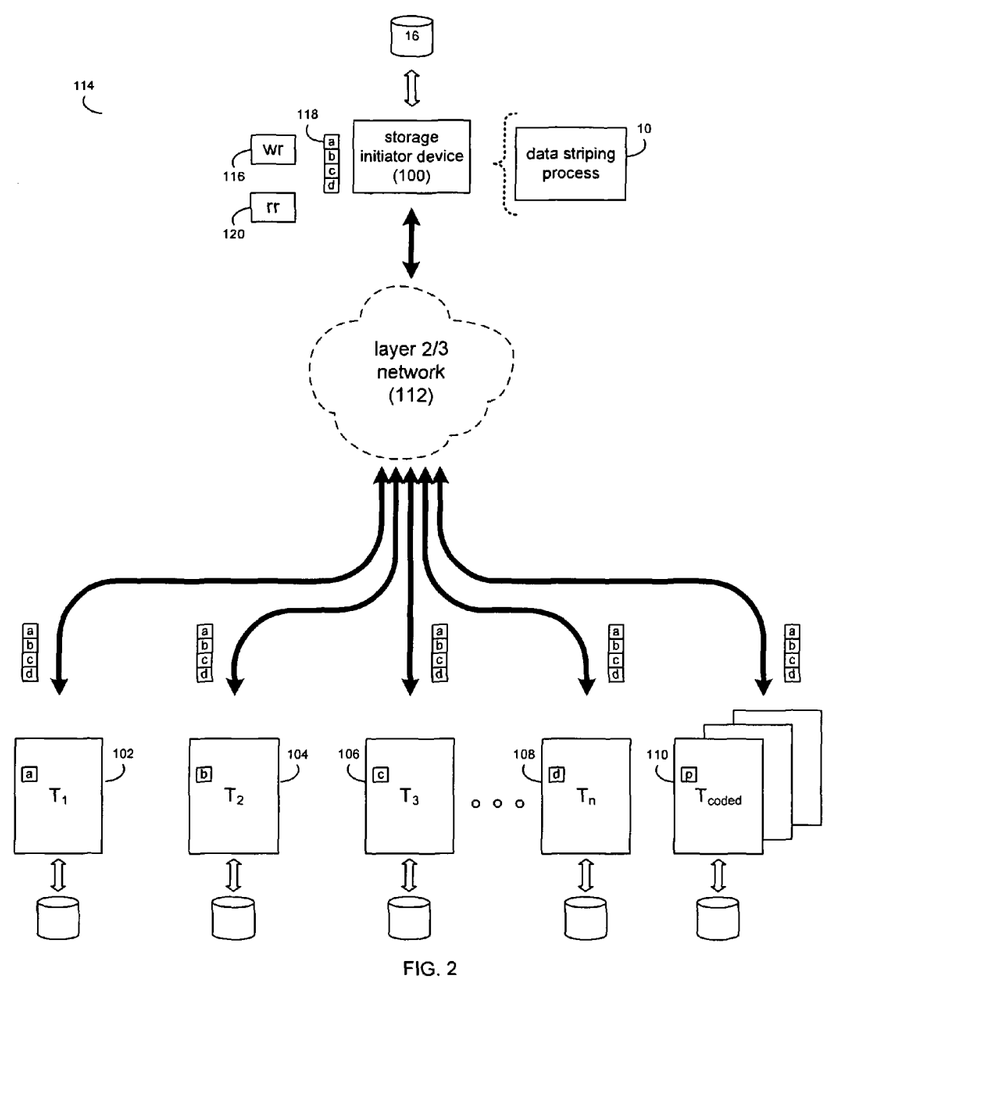
FIG. 2 is a diagrammatic view of the storage array of FIG. 1.

Referring also to FIG. 2, storage network 12 may include a storage initiator device (e.g. storage initiator device 100), a plurality of storage targets $T_{1-n}$ (e.g. storage targets 102, 104, 106, 108), and one or more coded targets 110. While in this particular example, storage network 12 is shown to include four storage targets (e.g. storage targets 102, 104, 106, 108) and one coded target (e.g., coded target 110), this is for illustrative purposes only and is not intended to be a limitation of this disclosure. Specifically, the actual number of storage targets and/or coded targets may be increased or decreased depending upon e.g. the level of redundancy required.

The manner in which storage network 12 is implemented may vary depending upon e.g. the level of redundancy required. For example, storage network 12 may be a RAID array in which storage initiator device 100 is a RAID controller card and storage targets 102, 104, 106, 108 and/or coded target 110 are individual "hot-swappable" hard disk drives. An example of such a RAID array may include but is not limited to an NAS device. Alternatively, storage network 12 may be configured as a SAN, in which storage initiator device 100 may be e.g., a server computer and each of storage targets 102, 104, 106, 108 and/or coded target 110 may be a RAID array and/or computer-based hard disk drive. Further still, one or more of storage targets 102, 104, 106, 108 and/or coded target 110 may be a SAN.

In the event that storage network 12 is configured as a SAN, the various components of storage network 12 (e.g. storage initiator device 100, storage targets 102, 104, 106, 108, and coded target 110) may be coupled using network infrastructure 112, examples of which may include but are not limited to a Layer 2 network and a Layer 3 network.

As is known in the art, the data link layer is Layer 2 of the seven-layer OSI model as well as the five-layer TCP/IP model. Layer 2 may respond to service requests from the network layer and may issue service requests to the physical layer. Within a Layer 2 network, devices (e.g. storage initiator device 100, storage targets 102, 104, 106, 108, and coded target 110) may be addressed using MAC (i.e., Media Access Control) addresses. When network infrastructure 112 is a Layer 2 network infrastructure, each of storage initiator device 100, storage targets 102, 104, 106, 108, and coded target 110 may have a unique MAC address.

Further and as is known in the art, the network layer is Layer 3 of the seven-layer OSI model as well as the five-layer TCP/IP model. Layer 3 may respond to service requests from the transport layer and may issue service requests to the data link layer. In the TCP/IP model, Layer 3 may be referred to as the Internet layer. Within a Layer 3 network, devices (e.g. storage initiator device 100, storage targets 102, 104, 106, 108, and coded target 110) may be addressed using IP (i.e., Internet Protocol) addresses. When network infrastructure 112 is a Layer 3 network infrastructure, each of storage initiator device 100, storage targets 102, 104, 106, 108, and coded target 110 may have a unique IP address.

Generally, the network layer (i.e., Layer 3) may be responsible for end-to-end (e.g., source to destination) data delivery, whereas the data link layer (i.e., Layer 2) may be responsible for node-to-node (e.g., hop to hop) data delivery.

Storage initiator device 100 may execute all or a portion of data striping process 10. Additionally, one or more of storage targets 102, 104, 106, 108, and coded target 110 may execute all or a portion of data striping process 10. For example, data striping process 10 may be a multi-component process that includes e.g., an initiator-based component (not shown) and a target-based component (not shown). For example and for illustrative purposes, the initiator-based component of data striping process 10 may be executed on storage initiator device 100. Further and for illustrative purposes, the target-based component of data striping process 10 may be executed on each of storage targets 102, 104, 106, 108, and coded target 110. Accordingly, the initiator-based component of data striping process 10 and the target-based component(s) of data striping process 10 may cooperatively operate to effectuate all of the functionality of data striping process 10.

The instruction sets and subroutines of the initiator-based component of data striping process 10, which may be stored on a storage device (e.g., storage device 16) coupled to storage initiator device 100, may be executed by one or more processors (not shown) and one or more memory architectures (not shown) included within storage initiator device 100. Storage device 16 may include but is not limited to: a hard disk drive; a tape drive; an optical drive; a RAID array; a random access memory (RAM); and a read-only memory (ROM).

The instruction sets and subroutines of the target-based component of data striping process 10, which may be stored on a storage device (not shown) coupled to e.g., each of storage targets 102, 104, 106, 108, and coded target 110, may be executed by one or more processors (not shown) and one or more memory architectures (not shown) included within each of storage targets 102, 104, 106, 108, and coded target 110. The storage device (not shown) may include but is not limited to: a hard disk drive; a tape drive; an optical drive; a RAID array; a random access memory (RAM); and a read-only memory (ROM).

Figures 3, 4:
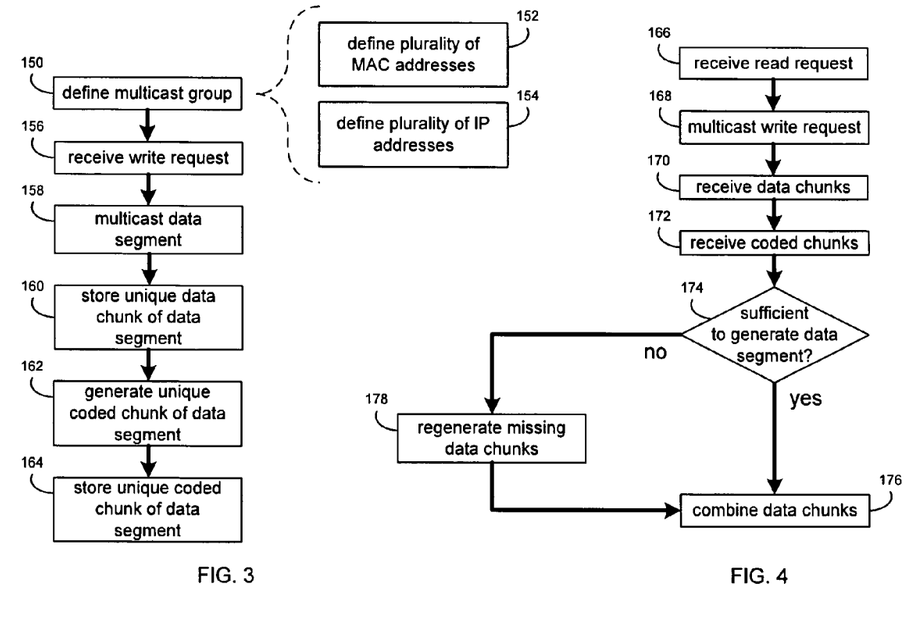
FIG. 3 is a flowchart of a data write process executed by the data striping process of FIG. 1.
FIG. 4 is a flowchart of a data read process executed by the data striping process of FIG. 1.

Referring also to FIG. 3, data striping process 10 may utilize multicasting to distribute data requests between various devices (e.g. storage initiator device 100, storage targets 102, 104, 106, 108, and coded target 110) included within storage network 12. Accordingly, data striping process 10 may define 150 a multicast group (e.g. multicast group 114) within network infrastructure 112, such that a message multicast by any device within storage network 12 may be received by any other device within storage network 12. When defining multicast group 114, the manner in which the multicast group is defined may vary depending on the type of network infrastructure (e.g. Layer 2 or Layer 3). For example, when data striping process 10 is defining 150 a multicast group within a Layer 2 network infrastructure, data striping process 10 may define 152 multicast group 114 as a plurality of MAC addresses to be addressable as a whole by a single multicast IP address. Alternatively, when data striping process 10 is defining 150 a multicast group within a Layer 3 infrastructure, data striping process 10 may define 154 multicast group 114 as a plurality of IP addresses to be addressable as a whole by a single multicast IP address.

As discussed above, various data requests (e.g. data request 20) may be sent from client applications 22, 24, 26, 28 to storage network 12, and examples of data request 20 may include but are not limited to data write requests (i.e. a request that a data segment be written to storage network 12) and data read requests (i.e. a request that a data segment be read from storage network 12).

Upon storage initiator device 100 receiving 156 a write request (e.g. write request 116) for storing a data segment (e.g. data segment 118) within multicast group 114, data striping process 10 may multicast 158 data segment 118 to the storage targets (e.g. storage targets 102, 104, 106, 108) and each of the coded targets (e.g., coded target 110) included within multicast group 114. When multicasting 158 data segment 118 to each of storage targets 102, 104, 106, 108 and coded target 110, data striping process 10 may provide data segment 118 in its entirety to the storage targets and the coded target. For illustrative purposes, assume that data segment 118 is an eight-kilobyte data segment that includes four two-kilobyte data chunks, namely data chunk "a", data chunk "b", data chunk "c", and data chunk "d". Accordingly, when multicasting 158 data segment 118 to each of storage targets 102, 104, 106, 108 and coded target 110, data striping process 10 may multicast 158 the entire eight-kilobyte data segment (including data chunk "a", data chunk "b", data chunk "c", and data chunk "d").

Upon receiving data segment 118, which was multicast 158 by storage initiator device 100, data striping process 10 may store 160 a unique data chunk of the data segment 118 on each of the plurality of storage targets (e.g. storage targets 102, 104, 106, 108). For example, data striping process 10: may store 160 data chunk "a" on storage target 102; may store 160 data chunk "b" on storage target 104; may store 160 data chunk "c" on storage target 106; and may store 160 data chunk "d" on storage target 108. Accordingly, a unique data chunk (e.g., data chunk "a", data chunk "b", data chunk "c", or data chunk "d") of data segment 118 may be stored 160 on each of storage targets 102, 104, 106, 108 (respectively), thus providing an increased level of performance. Specifically, when data segment 118 is subsequently read, each of storage targets 102, 104, 106, 108 may simultaneously provide their respective data chunk to storage initiator device 100, thus reducing the amount of time required to obtain data segment 118.

Upon receiving data segment 118, data striping process 10 may generate 162 a unique coded chunk (e.g., coded chunk "p") of the data segment 118 on each of the coded targets (e.g. coded target 110). When generating 162 coded chunk "p", coded chunk "p" may be generated on coded target 110. The level of complexity of coded chunk "p" may vary depending upon the computational capabilities of coded target 110 and the desired level of redundancy. For example, coded target 110 may be configured as a "parity" drive that is used to store parity information (e.g., coded chunk "p") for data segment 118 that is generated 162 using the various data chunks (e.g., data chunk "a", data chunk "b", data chunk "c", and data chunk "d") of data segment 118.

When designing a storage array (e.g. storage network 12) to be highly available for data redundancy, high availability may be achieved by either mirroring data, erasure encoding data (e.g. via the use of a parity/coded drives), or via a combination of both. Data mirroring is essentially maintaining a real-time (or essentially real-time) redundant copy of the data on a separate hard disk drive (or data storage system). Accordingly, when mirroring data that is "striped" across a plurality of hard disk drives (via the use of e.g. a plurality of data chunks), the number of hard disk drives required to construct the storage array is the product of the number of "striped" drives and the desired number of data "mirrors".

By erasure encoding data, the total number of drives required to obtain the desired level of high availability may be reduced. Specifically, a single parity drive may be used to provide high availability for a plurality of storage targets. For example, storage network 12 is shown to include four storage targets, namely storage target 102, storage target 104, storage target 106, and storage target 108. Accordingly, coded target 110 may be configured as a "parity" drive and may provide a level of high availability for storage targets 102, 104, 106, 108.

As discussed above, a complete copy of data segment 118 (including e.g., data chunk "a", data chunk "b", data chunk "c", and data chunk "d") may be multicast 158 to each of storage targets 102, 104, 106, 108 and coded target 110. Further and as discussed above, data striping process 10 may use data chunk "a", data chunk "b", data chunk "c", and data chunk "d" to generate 162 coded chunk "p" on coded target 110. Specifically, coded chunk "p" may be generated 162 by determining the exclusive—or of data chunk "a", data chunk "b", data chunk "c", and data chunk "d". Provided a coded chunk "p" is generated 162 for a data segment stored within storage network 12, in the event that a particular data chunk (e.g. data chunk "a", data chunk "b", data chunk "c", or data chunk "d") of the data segment is lost/damaged, the lost/damaged data chunk may be regenerated using coded chunk "p" (as will be discussed below in greater detail). Once coded chunk "p" is generated 162, coded chunk "p" may be stored 164 on the coded targets (e.g. coded target 110).

As discussed above, while storage network 12 is shown to include a single coded target (e.g. coded target 110), this is for illustrative purposes only and is not intended to be a limitation of this disclosure. For example, the number of coded targets may be increased to provide an enhanced level of high availability. For example, a plurality of coded targets (shown in phantom) may be utilized with one or more highly-tolerant, error correction algorithms, such as the Reed-Solomon error correction algorithm and the Low-Density, Parity-Check code (i.e. LDPC code) error correction algorithm.

When storing 160 the unique data chunk (e.g., data chunk "a", data chunk "b", data chunk "c", or data chunk "d") and the unique coded chunk (e.g., coded chunk "p") of data segment 118 on each of storage targets 102, 104, 106, 108 (respectively), the unique data chunks and the unique coded chunk may be stored in a manner that facilitates easy retrieval (i.e. during read requests) of data segment 118. For example, each data chunk and coded chunk may be stored at the same memory address on each of storage targets 102, 104, 106, 108 and coded target 110. Specifically, when the four two-kilobyte data chunks (e.g., data chunk "a", data chunk "b", data chunk "c", and data chunk "d") of eight-kilobyte data segment 118 are stored 160 on storage targets 102, 104, 106, 108 and the two-kilobyte coded chunk (e.g., coded chunk "p") of eight-kilobyte data segment 118 is generated 162 and stored 164 on coded target 110, each two-kilobyte data chunk and coded chunk may be stored at the same memory address within each of storage targets 102, 104, 106, 108 and coded target 110.

Upon receiving data segment 118, the storage target/coded target receiving data segment 118 may transmit a positive acknowledgment to multicast group 114 (i.e. a message that announces that the subject storage target/coded target did receive data segment 118.

Conversely, in the event that the storage target/coded target fails to receive data segment 118, the storage target/coded target in question may transmit a negative acknowledgment to multicast group 114 (i.e. a message that announces that the subject storage target/coded target did not receive data segment 118. In the event that a negative acknowledgment is transmit to multicast group 114, one or more of the storage targets/coded targets that did indeed successfully receive data segment 118 may either multicast data segment 118 to multicast group 114 or may unicast data segment 118 to the specific storage target/coded target that transmit the negative acknowledgment (i.e., the storage target/coded target that did not receive the multicast data segment).

Referring also to FIG. 4, upon storage initiator device 100 receiving 166 a read request (e.g. read request 120) for reading a data segment (e.g. data segment 118) from multicast group 114, data striping process 10 may multicast 168 read request 120 to the storage targets (e.g. storage targets 102, 104, 106, 108) and each coded target (e.g., coded target 110) included within multicast group 114.

Upon receiving read request 120, each of storage targets 102, 104, 106, 108 may retrieve the appropriate data chunk of data segment 118 for transmitting (either as a multicast or unicast) to storage initiator device 100. Further, coded target 110 may retrieve the appropriate coded chunk of data segment 118 for transmitting (either as a multicast or unicast) to storage initiator device 100.

As discussed above, data striping process 10 may store 160 a unique data chunk of data segment 118 on each of the plurality of storage targets (e.g. storage targets 102, 104, 106, 108). For example, data striping process 10: may store 160 data chunk "a" on storage target 102; may store 160 data chunk "b" on storage target 104; may store 160 data chunk "c" on storage target 106; and may store 160 data chunk "d" on storage target 108. Accordingly, upon receiving read request 120: storage target 102 may retrieve data chunk "a"; storage target 104 may retrieve data chunk "b"; storage target 106 may retrieve data chunk "c"; and storage target 108 may retrieve data chunk "d". Further and as discussed above, data striping process 10 may generate 162 and store 164 a coded chunk (e.g. coded chunk "p") of data segment 118 on coded target 110.

As discussed above, when storing 160 the unique data chunk (e.g., data chunk "a", data chunk "b", data chunk "c", or data chunk "d") of data segment 118 on each of storage targets 102, 104, 106, 108 (respectively) and storing 164 the unique coded chunk (e.g. coded chunk "p"), the unique data chunks and unique coded chunk may be stored in a manner that facilitates easy retrieval (i.e. during read requests) of data segment 118. For example, each data chunk/coded chunk may be stored at the same memory address on each of storage targets 102, 104, 106, 108. Accordingly, when retrieving the four two-kilobyte data chunks (e.g., data chunk "a", data chunk "b", data chunk "c", and data chunk "d") of eight-kilobyte data segment 118 stored on storage targets 102, 104, 106, 108 and the two-kilobyte coded chunk (e.g., coded chunk "p") of eight-kilobyte data segment 118 stored on coded target 110, a two-kilobyte read operation may be performed at the same memory address on each of storage targets 102, 104, 106, 108 and coded target 110 to effectuate the retrieval of the four two-kilobyte data chunks (e.g., data chunk "a", data chunk "b", data chunk "c", and data chunk "d") and the two-kilobyte coded chunk (e.g., coded chunk "p").

Upon retrieving the appropriate data chunks, storage targets 102, 104, 106, 108 may transmit (either as a multicast or unicast) data chunk "a", data chunk "b", data chunk "c", and data chunk "d" (respectively) to storage initiator device 100. Further, upon retrieving the appropriate coded chunk, coded target 110 may transmit (either as a multicast or unicast) coded chunk "p" to storage initiator device 100.

Upon receiving 170 the appropriate data chunks transmit by e.g. storage targets 102, 104, 106, 108 and receiving 172 the appropriate coded chunk transmit by e.g. coded target 110, data striping process 10 may determine 174 if the data chunks received from the storage targets are sufficient to reconstruct data segment 118. As discussed above, eight-kilobyte data segment 118 includes four two-kilobyte data chunks namely data chunk "a", data chunk "b", data chunk "c", and data chunk "d".

Accordingly, if each of these four two-kilobyte data chunks is received by storage initiator device 100, data striping process 10 may determine 174 that the data chunks received from the storage targets (namely data chunk "a", data chunk "b", data chunk "c", and data chunk "d") are indeed sufficient to reconstruct data segment 118. If such a determination 174 is made, data striping process 10 may combine 176, on storage initiator device 100, the unique data chunk received from each of the plurality of storage targets to reconstruct data segment 118. Specifically, data striping process 10 may combine 176 data chunk "a", data chunk "b", data chunk "c", and data chunk "d" (respectively) on storage initiator device 100 to reconstruct data segment 118.

Alternatively, if data striping process 10 determines 174 that the data chunks received from the storage targets are insufficient to reconstruct data segment 118, data striping process 10 may first need to regenerate 178 one or more missing data chunks using one or more of: the unique data chunks received from the plurality of storage targets (e.g. data chunk "a", data chunk "b", data chunk "c", and data chunk "d"); and the unique coded chunk received from each of the one or more coded targets (e.g. coded chunk "p").

As discussed above, provided a coded chunk "p" is generated 162 for a data segment stored within storage network 12, in the event that a particular data chunk (e.g. data chunk "a", data chunk "b", data chunk "c", or data chunk "d") of the data segment is lost/damaged, the lost/damaged data chunk may be regenerated using coded chunk "p". For example, assume (as discussed above) that coded target 110 is configured as a "parity" drive and coded chunk "p" was generated by determining the exclusive—or of data chunk "a", data chunk "b", data chunk "c", and data chunk "d". Further, assuming for illustrative purposes that data striping process 10 determines 174 that data chunk "a" is lost/damaged, data striping process 10 may regenerate 178 lost/damaged data chunk "a" by determining the exclusive—or of coded chunk "p", data chunk "b", data chunk "c", and data chunk "d".

As discussed above, while storage network 12 is shown to include a single coded target (e.g. coded target 110), this is for illustrative purposes only and is not intended to be a limitation of this disclosure. For example, the number of coded targets may be increased to provide an enhanced level of high availability via one or more highly-tolerant, error correction algorithms (e.g. the Reed-Solomon error correction algorithm and the LDPC code error correction algorithm). Once any lost/damaged data chunks are regenerated 178, striping process 10 may combine 176, on storage initiator device 100, the data chunks to reconstruct data segment 118.

Once data segment 118 is reconstructed, data striping process 10 may transmit data segment 118 to the client electronic device (e.g., personal computer 38, laptop computer 40, personal digital assistant 42, and notebook computer 44) that requested data segment 118.

While data striping process 10 is described above as having a "dedicated" coded target (e.g. coded target 110), this is for illustrative purposes only and is not intended to be a limitation of this disclosure. Specifically, the coded target included within storage network 12 may be a "distributed" coded target in that the coded chunk for a first data segment may be stored on a first physical device, the coded chunk for a second data segment may be stored on a second physical device, and the coded chunk for a third data segment may be stored on a third physical device. For example, for data segment 118, coded target 110 is described as storing coded chunk "p" and storage targets 102, 104, 106, 108 are described as storing data chunk "a", data chunk "b", data chunk "c", and data chunk "d" (respectively). However, for a subsequent data segment (data segment "x"; not shown), target 102 may be configured to store coded chunk "p" (for data segment "x") and targets 104, 106, 108, 110 may be configured to store data chunk "a", data chunk "b", data chunk "c", and data chunk "d" (for data segment "x"). Accordingly, data striping process 10 may vary the specific target assigned the task of storing the coded chunk depending upon the specific data segment being stored within storage network 12.

While data striping process 10 is described above as regenerating 178 any lost/damaged data chunks on storage initiator device 100, this is for illustrative purposes only and is not intended to be a limitation of this disclosure. For example, as storage network 12 is configured as a multicast group, in the event that a data chunk is lost/damaged, any target (e.g. storage target 102, 104, 106, 108 and/or coded target 110) may be used to regenerate the lost/damaged data chunk (instead of storage initiator device 100).

A number of implementations have been described. Nevertheless, it will be understood that various modifications may be made. Accordingly, other implementations are within the scope of the following claims.

What is claimed is:

1. A multicast data striping method comprising:
    defining a multicast group within a local area network, wherein the multicast group includes a storage initiator device, a plurality of storage targets, and one or more coded targets, wherein the one or more coded targets includes a distributed coded target;
    receiving, on the storage initiator device, a write request for storing a data segment within the multicast group;
    multicasting the data segment to the plurality of storage targets and the one or more coded targets included within the multicast group;
    storing a unique data chunk of the data segment on each of the plurality of storage targets; and
    generating and storing a unique coded chunk of the data segment on each of the one or more coded targets.

2. The multicast data striping method of claim 1 wherein defining the multicast group includes one or more of:
    defining a group of IP addresses to be addressable as a whole by a single multicast IP address; and
    defining a group of MAC addresses to be addressable as a whole by a single multicast IP address.

3. The multicast data striping method of claim 1 further comprising:
    generating the unique coded chunk using one or more of the unique data chunks.

4. The multicast data striping method of claim 3 wherein generating the unique coded chunk using one or more of the unique data chunks includes:
    generating, on the one or more coded targets, the unique coded chunk using one or more of the unique data chunks.

5. The multicast data striping method of claim 1 wherein at least one of the plurality of storage targets is chosen from the group consisting of: a hard drive; a RAID array of hard drives; a computer device including one or more hard drives; and a server computer.

6. A computer program product residing on a computer readable medium having a plurality of instructions stored thereon which, when executed by a processor, cause the processor to perform operations comprising:
    defining a multicast group within a local area network, wherein the multicast group includes a storage initiator device, a plurality of storage targets, and one or more coded targets, wherein the one or more coded targets includes a distributed coded target;
    receiving, on the storage initiator device, a write request for storing a data segment within the multicast group;
    multicasting the data segment to the plurality of storage targets and the one or more coded targets included within the multicast group;
    storing a unique data chunk of the data segment on each of the plurality of storage targets; and
    generating and storing a unique coded chunk of the data segment on each of the one or more coded targets.

7. The computer program product of claim 6 wherein the instructions for defining the multicast group include instructions for one or more of:
    defining a group of IP addresses to be addressable as a whole by a single multicast IP address; and
    defining a group of MAC addresses to be addressable as a whole by a single multicast IP address.

8. The computer program product of claim 6 further comprising instructions for:
    generating the unique coded chunk using one or more of the unique data chunks.

9. The computer program product of claim 8 wherein the instructions for generating the unique coded chunk using one or more of the unique data chunks include instructions for:
    generating, on the one or more coded targets, the unique coded chunk using one or more of the unique data chunks.

10. The computer program product of claim 6 wherein at least one of the plurality of storage targets is chosen from the group consisting of: a hard drive; a RAID array of hard drives; a computer device including one or more hard drives; and a storage area network.

11. A multicast data striping method comprising:
    defining a multicast group within a local area network, wherein the multicast group includes a storage initiator device, a plurality of storage targets, and one or more coded targets, wherein the one or more coded targets includes a distributed coded target;
    receiving, on the storage initiator device, a read request for reading a data segment from the multicast group;
    multicasting the read request to the plurality of storage targets and the one or more coded targets included within the multicast group;
    receiving, on the storage initiator device, one or more unique data chunks of the data segment from the plurality of storage targets; and
    receiving, on the storage initiator device, a unique coded chunk of the data segment from each of the one or more coded targets.

12. The multicast data striping method of claim 11 wherein defining the multicast group includes one or more of:
    defining a group of IP addresses to be addressable as a whole by a single multicast IP address; and defining a group of MAC addresses to be addressable as a whole by a single multicast IP address.

13. The multicast data striping method of claim 11 wherein at least one of the plurality of storage targets is chosen from the group consisting of: a hard drive; a RAID array of hard drives; a computer device including one or more hard drives; and a storage area network.

14. The multicast data striping method of claim 11 further comprising:
  combining, on the storage initiator device, the unique data chunks received from the plurality of storage targets to reconstruct the data segment.

15. The multicast data striping method of claim 11 further comprising:
  if the unique data chunks received from the plurality of storage targets are insufficient to reconstruct the data segment, regenerating one or more missing data chunks using one or more of:
    the unique data chunks received from the plurality of storage targets; and
    the unique coded chunk received from each of the one or more coded targets.

16. A computer program product residing on a computer readable medium having a plurality of instructions stored thereon which, when executed by a processor, cause the processor to perform operations comprising:
  defining a multicast group within a local area network, wherein the multicast group includes a storage initiator device, a plurality of storage targets, and one or more coded targets, wherein the one or more coded targets includes a distributed coded target;
  receiving, on the storage initiator device, a read request for reading a data segment from the multicast group;
  multicasting the read request to the plurality of storage targets and the one or more coded targets included within the multicast group;
  receiving, on the storage initiator device, one or more unique data chunks of the data segment from the plurality of storage targets; and
  receiving, on the storage initiator device, a unique coded chunk of the data segment from each of the one or more coded targets.

17. The computer program product of claim 16 wherein the instructions for defining the multicast group include one or more of:
  defining a group of IP addresses to be addressable as a whole by a single multicast IP address; and
  defining a group of MAC addresses to be addressable as a whole by a single multicast IP address.

18. The computer program product of claim 16 wherein at least one of the plurality of storage targets is chosen from the group consisting of: a hard drive; a RAID array of hard drives; a computer device including one or more hard drives; and a storage area network.

19. The computer program product of claim 16 further comprising instructions for:
  combining, on the storage initiator device, the unique data chunks received from the plurality of storage targets to reconstruct the data segment.

20. The computer program product of claim 16 further comprising instructions for:
  if the unique data chunks received from the plurality of storage targets are insufficient to reconstruct the data segment, regenerating one or more missing data chunks using one or more of:
    the unique data chunks received from the plurality of storage targets; and
    the unique coded chunk received from each of the one or more coded targets.

* * * * *